S. J. THOMPSON.
SWEET POTATO DIGGER.
APPLICATION FILED SEPT. 17, 1915.

1,184,897.

Patented May 30, 1916.

Witnesses
G. W. Hauke
C. C. Chandler

Inventor
S. J. Thompson
By Chandler & Chandler
Attorneys.

UNITED STATES PATENT OFFICE.

SAMUEL J. THOMPSON, OF GREENWOOD, SOUTH CAROLINA.

SWEET-POTATO DIGGER.

1,184,897.      Specification of Letters Patent.      Patented May 30, 1916.

Application filed September 17, 1915. Serial No. 51,245.

*To all whom it may concern:*

Be it known that I, SAMUEL J. THOMPSON, a citizen of the United States, residing at Greenwood, in the county of Greenwood, State of South Carolina, have invented certain new and useful Improvements in Sweet-Potato Diggers; and I do hereby declare the following to be a full, clear, and exact description of the invention, such as will enable others skilled in the art to which it appertains to make and use the same.

This invention relates to a sweet potato digger.

An object of the invention resides in the provision of an implement by means of which sweet potatoes may be dug from the ground and deposited thereon in such condition that they may subsequently be conveniently gathered.

A further object of the invention resides in the provision of means for severing a portion of the vines so that the potatoes may be more readily dug.

A still further object of the invention resides in the provision of a shaker which will free the potatoes from the dirt.

With these and other objects in view, such as will appear as my description progresses, my invention comprises the combination and arrangement of parts as set forth in and falling within the scope of the appended claim.

Figure 1:
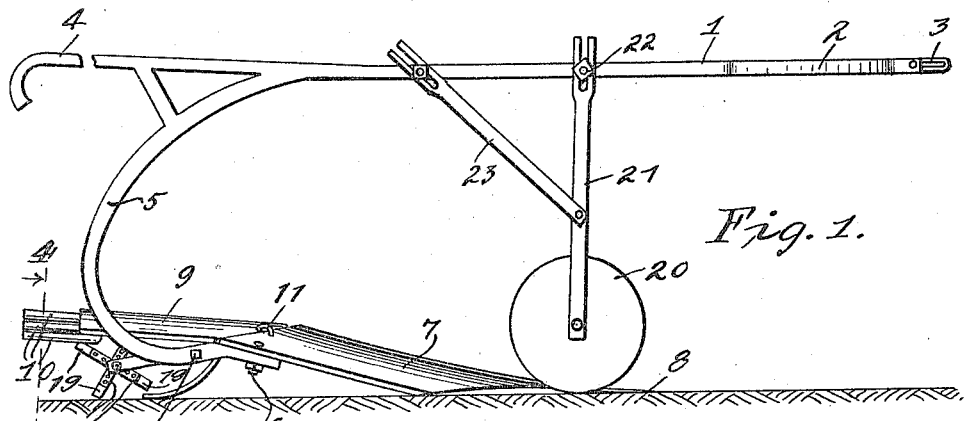
Figure 2:
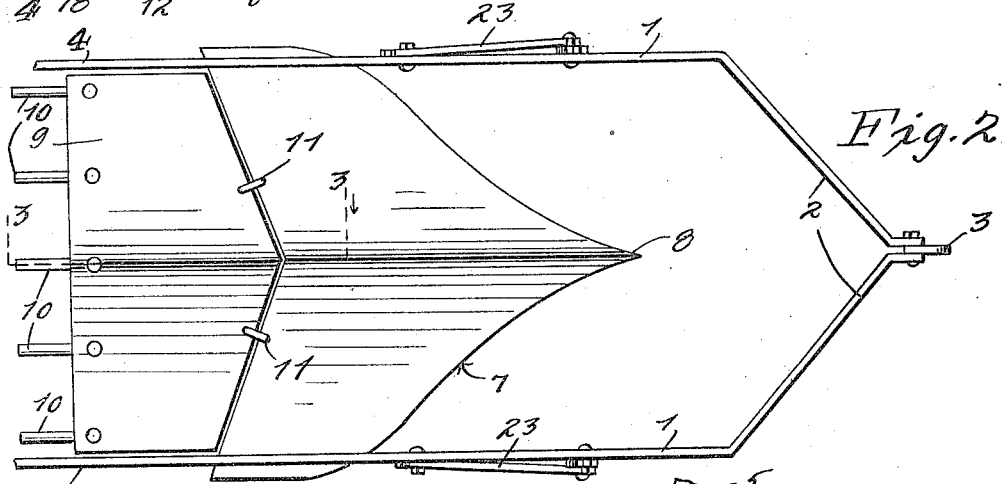
Figure 3:
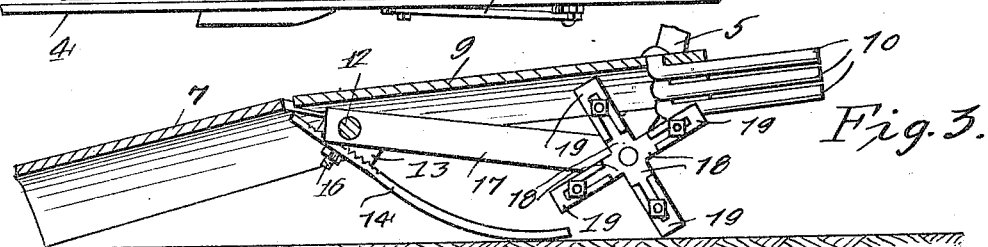
Figure 4:
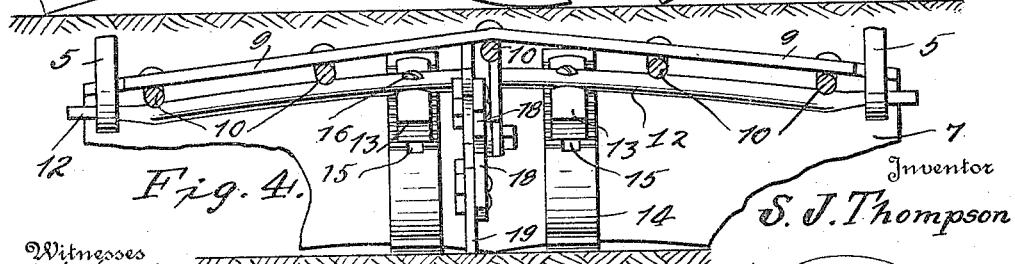

In the drawing: Figure 1 is a side elevation of my device; Fig. 2 is a plan view thereof; Fig. 3 is a longitudinal sectional view on line 3—3 of Fig. 2, looking in the direction of the arrows, and Fig. 4 is a section on line 4—4 of Fig. 1.

Referring to the drawing by reference characters wherein like parts are indicated by like characters throughout the several views: In the embodiment of the invention shown in the drawing, I have provided a frame which consists of a pair of spaced parallel bars 1 which are provided at their forward ends with converging portions 2 to which a clevis 3 is secured. A pair of handles 4 is formed integral with these bars 1. The rear portions of the bars extend downwardly to form supporting arms 5. Secured on the ends of these arms 5 by means of bolts 6 is a blade 7, the forward edges of which converge to a point 8. The sides of this blade lie in angular relation to each other as clearly illustrated in Fig. 2 of the drawing and are concaved. This blade extends upwardly from the point 8 to the points where it is attached to the arms 5. A shaker which includes a plate 9 and a plurality of rearwardly extending fingers 10 is loosely hinged by means of links 11 to the rear of the blade 7. The sides of this plate 9 are disposed in angular relationship to each other.

In order that the rear end of the blade 7 may be supported in spaced relation to the ground and the distance varied, I have provided a shaft 12 which extends between and is secured to the lower ends of the arms 5. Secured to this shaft 12 in spaced relation is a pair of blocks 13, the lower faces of which are serrated. Supporting strips 14 which are provided with slots 15 and serrated faces are secured to these blocks 13 by bolts 16 which extend through the shaft 12, the blocks 13 and the slots 15 in the strips 14. With this construction the positions of the strips 14 on the blocks may be varied and thus the distance of the rear of the blade 7 from the ground, varied.

In order that the shaker may be actuated, I have mounted an arm 17 on the shaft 12, on the end of which arm a knocker is pivotally mounted, which knocker is provided with a plurality of arms 18 which extend in angular relation to each other and on which plates 19 are adjustably mounted, which plates are operable to vary the effective lengths of the arms 18.

It has been found that the portions of the potato vines which grow between the rows somewhat interfere with the successful operation of a digger, that is, they tend to pull the potatoes laterally from the digging blade and shaker and to obviate this defect, I have provided a pair of cutting disks 20 which are supported on standards 21, which standards are adjustably secured to the bars 1 by suitable bolts 22 and are braced by adjustable rods 23.

In using the implement it is pushed along a row so that the cutting disks 20 will straddle the same and sever the ends of the vines from the portions on which the potatoes grow. The blade 7 digs beneath the potatoes and lifts them from the ground and as it passes beneath the potatoes they are raised until they are finally deposited on a shaker. The movement of this shaker which is accomplished by the rotation of the knocker will free the potatoes from the dirt, which dirt will drop from the shaker through the fingers 10. The potatoes will drop from the ends of the fingers and rest upon the ground in substantially the same place in which they grew so that they may be thereafter readily gathered.

From the foregoing description it will be seen that I have provided a device by means of which sweet potatoes may be readily dug from the ground and deposited on top of the same so that they can be thereafter gathered.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:—

In a sweet potato digger, the combination with a frame, of a blade carried thereby, a shaft extending transversely of the blade at the rear end thereof, blocks having serrated lower faces secured to the shaft, supporting strips having serrated faces in engagement with the serrated faces of the blocks and bolts passing through the shaft and the blocks and through slots in the strips.

In testimony whereof, I affix my signature, in the presence of two witnesses.

SAMUEL J. THOMPSON.

Witnesses:
ETHEL ESKEW,
C. C. FEATHERSTONE.

Copies of this patent may be obtained for five cents each, by addressing the "Commissioner of Patents, Washington, D. C."